No. 683,364. Patented Sept. 24, 1901.
E. B. WINTERS.
RIDING ATTACHMENT FOR WALKING PLOWS.
(Application filed Feb. 26, 1901.)
(No Model.)

WITNESSES:

INVENTOR
Edward B. Winters
BY
ATTORNEYS

UNITED STATES PATENT OFFICE.

EDWARD BLOUNT WINTERS, OF COFFEYVILLE, KANSAS, ASSIGNOR OF ONE-HALF TO WILLIAM P. BROWN, OF SAME PLACE.

RIDING ATTACHMENT FOR WALKING-PLOWS.

SPECIFICATION forming part of Letters Patent No. 683,364, dated September 24, 1901.

Application filed February 26, 1901. Serial No. 48,902. (No model.)

*To all whom it may concern:*

Be it known that I, EDWARD BLOUNT WINTERS, a citizen of the United States, and a resident of Coffeyville, in the county of Montgomery and State of Kansas, have invented a new and Improved Riding Attachment for Walking-Plows, of which the following is a full, clear, and exact description.

The purpose of the invention is to provide a simple, durable, and economic riding attachment to walking or lister plows and to so construct the attachment that it can be quickly and conveniently applied, right or left, to any size of plow-beam and adjusted upon the beam.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of a plow having the attachment applied thereto. Fig. 2 is an enlarged perspective view of a portion of the plow-beam and a part of the attachment applied to the beam, including an axle; and Fig. 3 is a vertical section taken substantially on the line 3 3 of Fig. 2.

A represents a plow-beam, the rear portion B of which is curved downward in the usual manner, and to this curved portion any form of share C is attached.

D represents a clamp which is detachably connected to the beam A near its rear end or where the curvature in the beam begins, and this clamp holds a spring-support 10 for a seat 11 firmly in engagement with the beam.
F represents one of the clamps comprising the attachment and adapted to hold an axle E relative to the beam A. Each clamp F consists of a plate 14, having bolts 15 passed through either its upper or its lower edges and bolts 17 passed through the said plate at its opposing edges. The bolts 17 are usually passed through slots 16 made in the plate, similar slots being provided for the bolts 15, so that the bolts can be adjusted to different vertical thicknesses of plow-beams, as one set of bolts passes across the top of plow-beam and the other set across the bottom portion of the beam, as is shown in Fig. 2. A sleeve 18 is attached to or made integral with the plate 14, which sleeve is usually reinforced by a rib 19, attached thereto and to the plate.

In connection with each plate 14 a plate 20 is employed, and the plates 14 are at one side of the plow-beam, while the plates 20 are at the opposite side of the beam. The plates 20 are usually provided with extensions 21 from one edge, having longitudinal slots 22 formed therein. The bolts 15 and 17 are passed through the body portions of the opposing plates and through the slots 16 and 22. Each plate 20 is provided with an upward arched extension, upon which rack-teeth 23 are formed. The bolts 15 and 17 serve to thoroughly clamp the opposing plates 14 and 20 to the beam. Two clamps F are employed, one being located near the center of the beam and the other near its front end. The rack-bearing plates of the clamps are at opposite sides of the plow-beam to which the clamps are attached, as shown in Fig. 1.

The straight portion of an axle E is passed through each sleeve 18 of a clamp and through the plate 14, connected with the sleeve, and through a suitable opening in the opposing-plate 20. One axle, usually the forward axle, is so placed that it extends across the top portion of the beam, while the rear axle extends across the bottom portion of the beam, and each axle is provided with a crank-arm 12, the crank-arm of one axle being at the right-hand side of the beam and the crank-arm of the other axle at the left-hand side, and each axle is provided with a supporting-wheel 13, loosely mounted thereon.

The crank-arms of the axles E may be raised or lowered through the medium of levers 24. These levers 24 are located upon the straight end portions of the axles E adjacent to the racks 23, and each lever 24 is provided with a thumb-latch 25, which extends down through a flange 26 on a lever to an engagement with the teeth of the rack 23, the flange 26 serving to guide the movement of the lever to which it is secured. The lower end of each lever 24 is provided with a recess 27, which receives a pin 28, secured to the axle E, to which the lever is applied, and a collar 29 is located on each axle E adjacent to the outer end of the sleeve 18, through which the axle passes. This sleeve is secured to the axle by a set-screw or a like device. Thus it will be observed that the axle is held against end movement in its bearings by its sleeve 29 and the lever 24, secured to the axle, as is best illustrated in Fig. 3.

It is evident that this attachment may be readily and conveniently adjusted to any form of walking or lister plow, converting the same into a riding-plow, and that either supporting-wheel of the riding attachment may be raised or lowered to suit the character of the ground being operated upon and to permit the share to enter the ground to a greater or less degree.

Having thus described my invention, I claim as new and desire to secure by Letters Patent—

1. A riding attachment for plows, consisting of opposing plates, means for clamping the said plates to opposite sides of a plow-beam, one of the said plates being provided with a sleeve, the other plate having a rack formed at its upper portion, an axle passed through the said sleeve and through both of the plates, and an adjusting-lever for the axle attached thereto and provided with means for engagement with said rack, as described.

2. A riding attachment for plows, consisting of a clamp, which clamp comprises two opposing plates, bolts adjustably connecting the same, one of the plates having a sleeve extending outward therefrom and the other plate having a rack formed thereon, a crank-axle passed through the said sleeve and through both of the plates, a lever attached to the body portion of the axle, a guide carried by said lever, adapted to travel over the said rack, and a thumb-latch also carried by the lever and arranged to pass through the said guide and engage with the rack, for the purpose set forth.

In testimony whereof I have signed my name to this specification in the presence of two subscribing witnesses.

EDWARD BLOUNT WINTERS.

Witnesses:
J. S. JOHNSON,
WILL R. FORKER.